United States Patent [19]

Lin

[11] Patent Number: 5,718,408

[45] Date of Patent: Feb. 17, 1998

[54] ADJUSTABLE SUPPORTING APPARATUS FOR SUPPORTING A WORKPIECE FEEDING MACHINE ON A WORKTABLE

[76] Inventor: Ching-Chi Lin, No. 473, San-Feng Rd., Kung-Kuan Tsun, Hou-Li Hsiang, Taichung Hsien, Taiwan

[21] Appl. No.: 623,451

[22] Filed: Mar. 28, 1996

[51] Int. Cl.⁶ .................................................. F16M 1/00
[52] U.S. Cl. .................... 248/676; 248/646; 248/662; 248/676; 248/678; 269/55
[58] Field of Search .......................... 248/646, 660, 248/661, 662, 663, 667, 676, 678, 649, 657, 664, 666, 278.1, 292.12; 269/55, 74, 212, 309

[56] References Cited

U.S. PATENT DOCUMENTS

| | | | |
|---|---|---|---|
| 207,349 | 8/1878 | Dutton | 269/55 |
| 1,818,501 | 8/1931 | Odin | 269/74 |
| 2,301,230 | 11/1942 | Smith | 248/661 |
| 2,340,572 | 2/1944 | Smith | 248/661 |
| 2,487,996 | 11/1949 | Wellwood et al. | 269/55 |
| 3,107,075 | 10/1963 | Matthews | 248/667 |
| 4,969,625 | 11/1990 | Singer et al. | 248/662 |
| 5,205,198 | 4/1993 | Foray et al. | 269/55 |
| 5,383,636 | 1/1995 | Karl | 248/278.1 |

Primary Examiner—Leslie A. Braun
Assistant Examiner—Gwendolyn W. Baxter
Attorney, Agent, or Firm—Bliss McGlynn, P.C.

[57] ABSTRACT

An adjustable supporting apparatus supports a workpiece feeding machine on a worktable and includes a base member fixed on the worktable and provided with a neck. A pivot member has a vertical sleeve portion sleeved rotatably on the neck and locked releasably on the neck by means of a vertical lock bolt unit, and a horizontal nose projecting from the vertical sleeve portion. When released, the pivot member can rotate about a vertical axis on the neck. A horizontal sleeve member is sleeved rotatably on the nose and locked releasably on the nose by means of a horizontal lock bolt unit. When released, the sleeve member can rotate about a horizontal axis on the nose. A positioning assembly has a tubular unit fastened to the sleeve member and formed with a passage into which a straight first end portion of a coupler rod is inserted. The rod includes a rack secured to the first end portion and engaging a pinion which is disposed within the tubular unit so that rotation of the pinion can be converted into the movement of the rod, and a bent second end portion having a distal end provided with a fixed ball locked releasably on the machine.

4 Claims, 6 Drawing Sheets

ADJUSTABLE SUPPORTING APPARATUS FOR SUPPORTING A WORKPIECE FEEDING MACHINE ON A WORKTABLE

BACKGROUND OF THE INVENTION

1. Field of the Invention

The invention relates to a workplace feeding machine, more particularly to an adjustable supporting apparatus for supporting a workpiece feeding machine on a worktable.

2. Description Of the Related Art

In order to enable a machine equipment to machine different shapes and sizes of workpieces, a supporting apparatus is usually employed to support a workplace feeding machine adjustably on a worktable so as to correspond with the size and shape of the workpiece.

Referring to FIG. 1, a conventional supporting apparatus for supporting a workpiece feeding machine 6 on a worktable 1A is shown to comprise a base 1 mounted on one corner of the worktable 1A, and an upright post 2 mounted on the base 1. A connector 3 is mounted slidably along the upright post 2. The connector 3 has one side which is formed with an internally threaded socket 3b. A rotatable threaded rod 3a extends threadedly through the socket 3b and is operable so as to cause upward or downward movement of the connector 3 along the upright post 2. The connector 3 is further provided with a horizontally extending tubular passage 3c to permit the extension of a horizontal shaft 4 therethrough. The tubular passage 3c has one side which is formed with an internally threaded socket (not shown). A rotatable threaded rod 4a extends threadedly through the socket of the tubular passage 3c and is operable so as to cause forward or rearward movement of the horizontal shaft 4 relative to the connector 3. The horizontal shaft 4 has a distal end with an inclined connector 5 mounted thereon. The in-lined connector 5 inclines downwardly by an angle of 45° with respect to a horizontal plane. The workplace feeding machine 6 is attached to a bottom end of the inclined connector 5. The bottom of the workplace feeding machine 6 is spaced from the workpiece 1A to permit feeding movement of a workpiece 1B on the worktable 1A.

The conventional supporting apparatus is relatively difficult to assemble because of the large number of components involved. Note that in the conventional supporting apparatus, an adjustment rod 7 is operated in order to tighten or loosen the connection between the base 1 and the upright post 2, the connection between the upright post 2 and the connector 3, the connection between the connector 3 and the horizontal shaft 4, the connection between the horizontal shaft 4 add the inclined connector 5, and the connection between the inclined connector 5 and the workplace feeding machine 6. Furthermore, operation of the threaded rods 3a, 4a necessary if it is desired to vary the positions of the connector 3 and the horizontal shaft 4. Thus, if changes are to be made In the workpiece surface to be machined or in the thickness or width of the workpiece, the adjustment rod 7 should be operated before the threaded rods 3a, 4a can be operated in order to adjust the position of the workpiece feeding machine 6 so as to enable the latter to press tightly against workpiece. After the workpiece feeding machine 6 has been adjusted to the desired position, the adjustment rod 7 is again operated in order to tighten the various connections.

When it is desired to change the workpiece surface that is to be machined, the workpiece feeding machine 6 has to be rotated and shifted in order to contact tightly the new workpiece surface. Normally, the positions of the connector 3 and the horizontal shaft 4 also have to be varied accordingly in order to ensure that the workpiece feeding machine 6 presses firmly against the workpiece. Adjustment of the conventional supporting apparatus is thus troublesome and cannot be performed conveniently.

SUMMARY OF TIME INVENTION

Therefore, the object of this invention is to provide an adjustable supporting apparatus for supporting a workpiece feeding Machine on a worktable, which apparatus facilitates adjustments in the position of the workpiece feeding machine relative to the worktable.

According to this invention, an adjustable supporting apparatus supports a workpiece feeding machine on a worktable and includes a base member fixed on the worktable and provided with a neck. A pivot member has a vertical sleeve portion sleeved rotatably on the neck and locked releasably on the neck by means of a vertical lock bolt unit, and a horizontal nose projecting from the vertical sleeve portion. When released, the pivot member can rotate about a vertical axis on the neck. A horizontal sleeve member is sleeved rotatably on the nose and locked releasably on the nose by means of a horizontal lock bolt unit. When released, the sleeve member can rotate about a horizontal axis on the nose. A positioning assembly has a tubular unit fastened to the sleeve member and formed with a longitudinal passage into which a straight first end portion of a coupler rod is inserted. The rod includes a rack secured to the first end portion and engaging a pinion which is disposed within the tubular unit so that rotation of the pinion can be converted into the movement of the rod, and a bent second end portion having a distal end provided with a fixed ball locked releasably on the machine.

BRIEF DESCRIPTION OF THE DRAWINGS

Other features and advantages of this invention will become apparent in the following detailed description of the preferred embodiment of this invention with reference to the accompanying drawings, in which.

DETAILED DESCRIPTION OF THE PREFERRED EMBODIMENT

Figure 1:
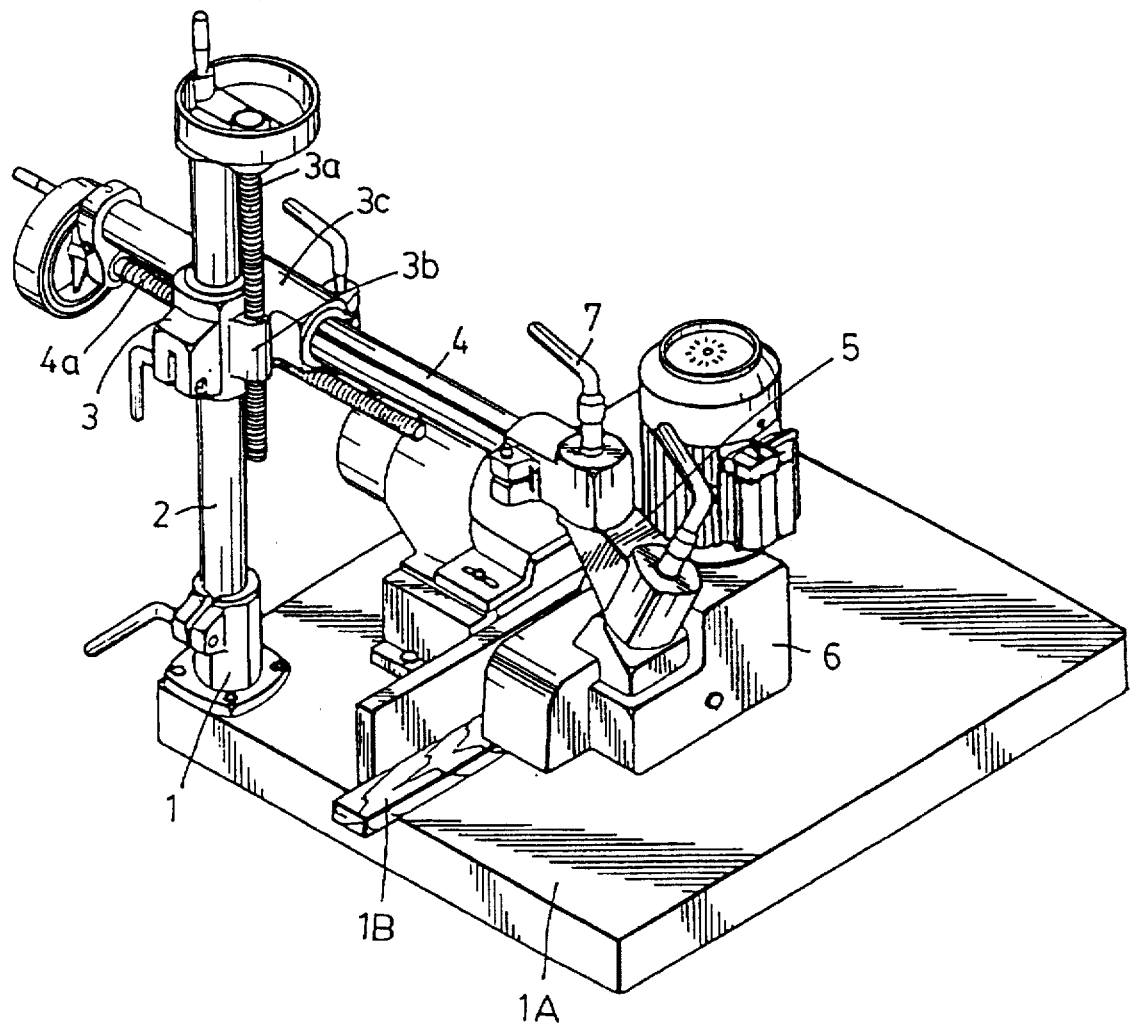
FIG. 1 is a perspective view of a conventional adjustable supporting apparatus or supporting a workpiece feeding machine on a worktable.
Figure 2:
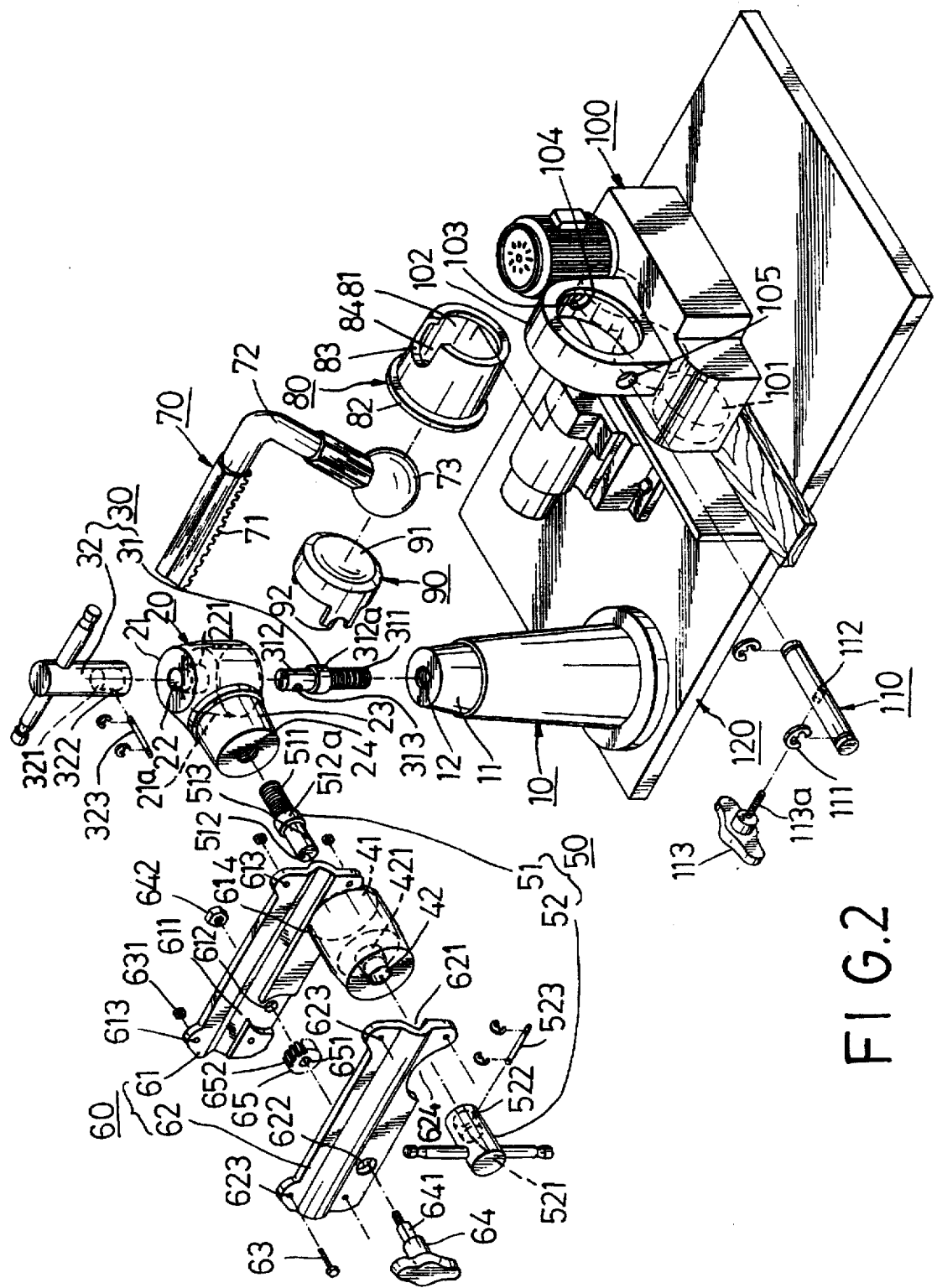
FIG. 2 is an exploded view of an adjustable supporting apparatus for supporting a workplace feeding machine on worktable according to this invention.
Figure 3:
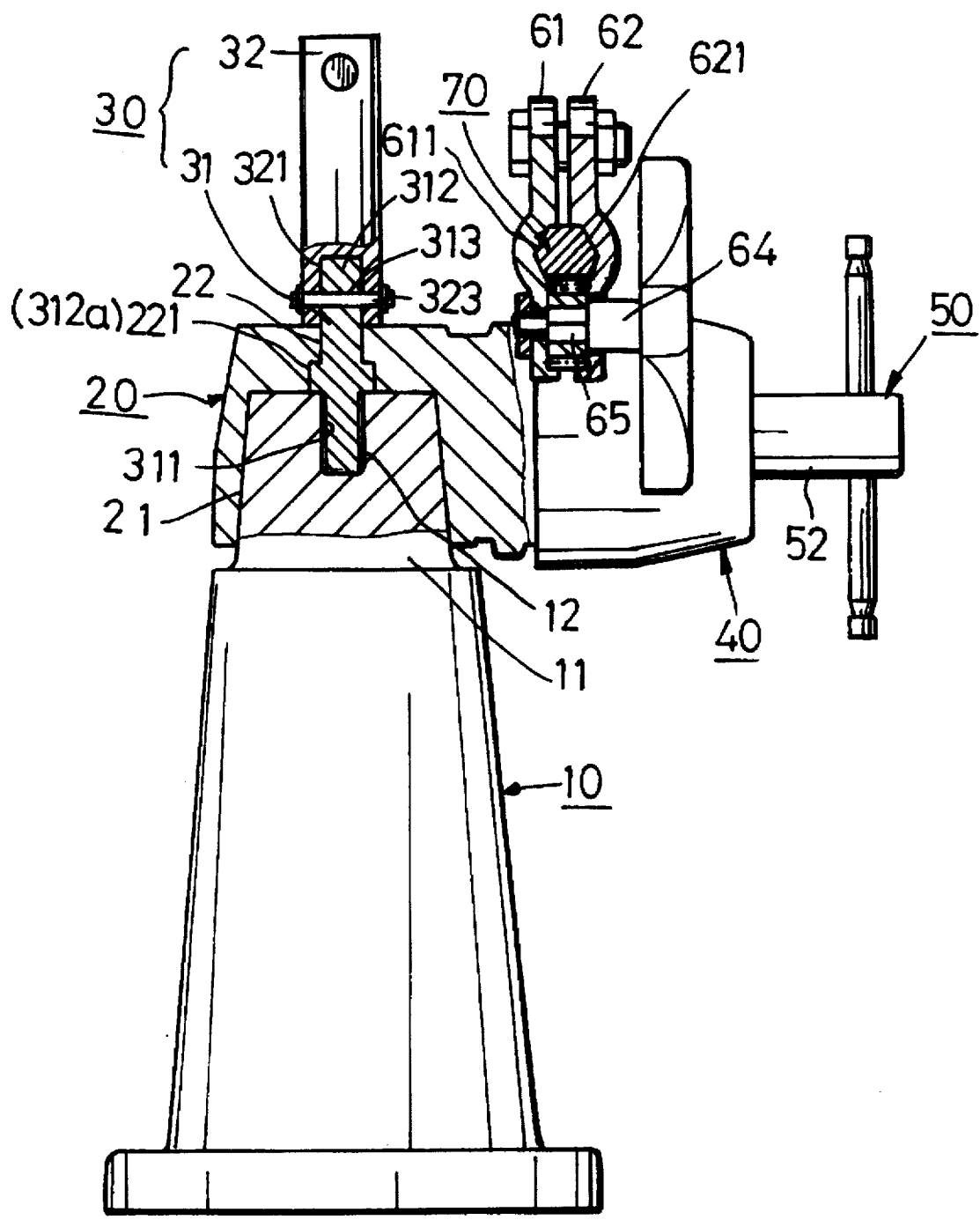
FIG. 3 illustrates how a pivot member is locked on a base member by means of a vertical lock bolt unit in accordance with this invention.
Figure 4:
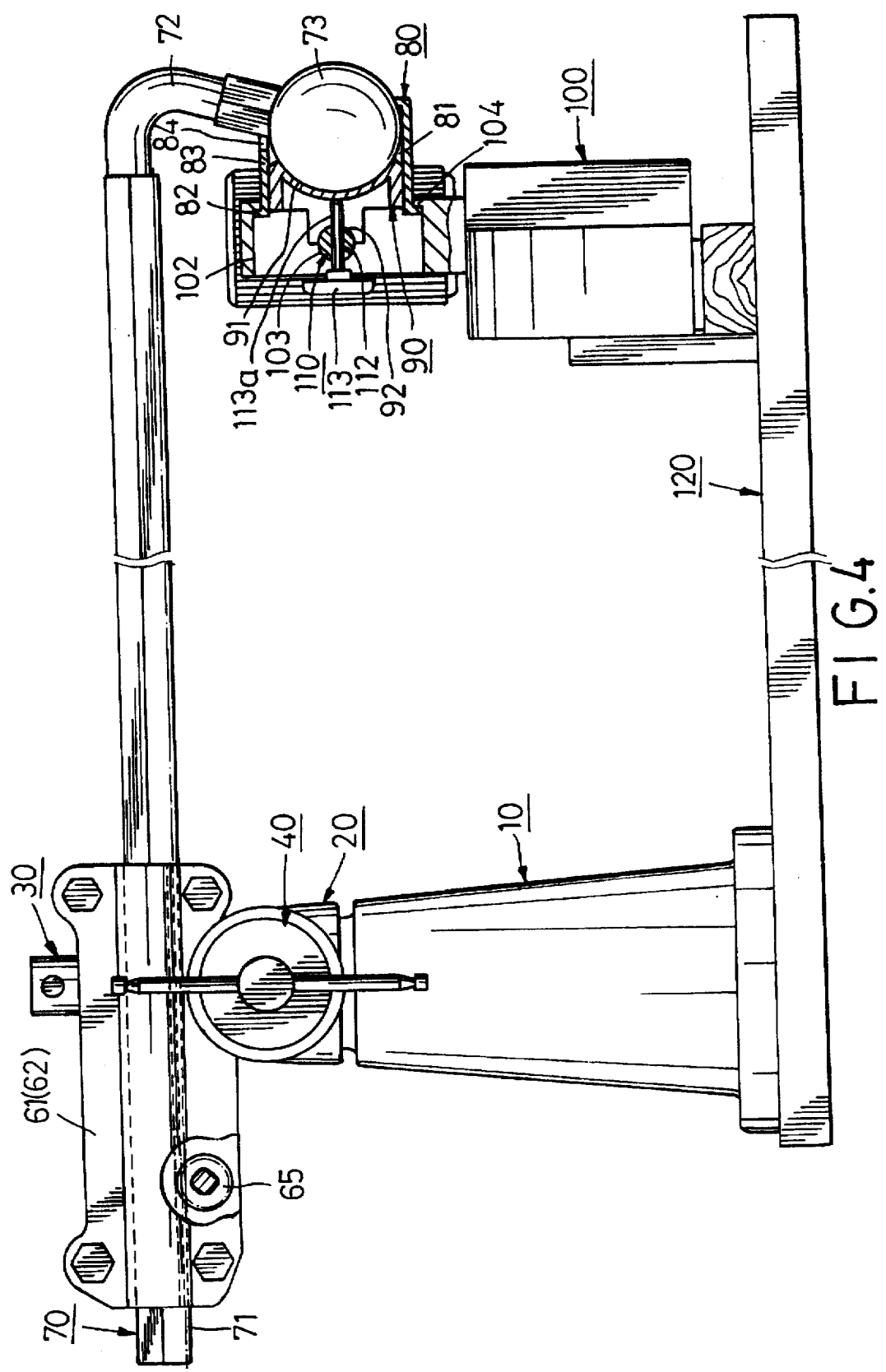
FIG. 4 illustrates how a coupler rod is locked on the workpiece feeding machine by means of a push unit in accordance with this invention.

Referring to FIGS. 2, 3 and 4, an adjustable supporting apparatus of this invention supports a workpiece feeding machine 100 on a worktable 120 and includes a base member 10, a pivot member 20, a vertical lock bolt unit 30, a horizontal sleeve member 40, a horizontal lock bolt unit 50, a positioning assembly 60, a coupler rod 70, a fixing seat 80, and a push unit which consists of a push member 90, a positioning bar 110, two retaining rings 111 and a rotary knob 113.

The base member 10 is fixed on the worktable 120 and has a vertical neck which has a large-diameter base section and a small-diameter end section 11 that are truncated conical. The end section 11 has a top end surface formed with a vertical threaded hole 12. The pivot member 20 has a vertical sleeve portion 21 and a horizontal nose which has a large-diameter base section projecting from the vertical sleeve portion 21, and a small-diameter end section 23 having an outer end surface formed with a horizontal threaded hole 24. The vertical sleeve portion 21 has a bottom surface formed with a truncated conical vertical recess 21a engaging fittingly the small-diameter end section 11 of the base member 10, and a top end wall formed therethrough with a central hole 22 which is communicated with the recess 21a and which has a small-diameter outer section and a large-diameter inner section 221.

The vertical lock bolt unit 30 consists of a vertical bolt element 31, a T-shaped first rotary lever 32, and a horizontal lock pin 323. The bolt element 31 has an externally threaded lower section 311 engaging threadably the vertical threaded hole 12 of the base member 10, an upper portion 312 extending through the small-diameter outer section of the central hole 22 of the pivot member 20 and formed with a horizontal pin hole 313, and a middle flange section 312a interconnecting securely the lower and upper sections 311, 312 and received fittingly within the large-diameter inner section 221 of the central hole 22 of the pivot member 20. The rotary lever 32 has a vertical connecting rod and two horizontal lever sections secured to two sides of the connecting rod. The connecting rod has a bottom surface formed with a vertical bore 321 engaging fittingly the upper section 312 of the bolt element 31, and two aligned radial pin holes 322 formed through the wall of the connecting rod in communication with the bore 321. The lock pin 323 extends through the pin holes 322 of the lever 32 and the pin hole 313 of the bolt element 31 so as to lock the lever 32 on the bolt element 31. The vertical sleeve portion 21 is clamped between the first rotary lever 32 and the large-diameter base section of the neck of the base member 10, so as to lock the pivot member 20 on the base member 10.

The horizontal sleeve member 40 has an inner end surface formed with a truncated conical horizontal recess 41 engaging fittingly the small-diameter end section 23 of the nose of the pivot member 20, and an outer end wall formed with a central hole 42 which consists of a small-diameter outer section and a large-diameter inner section 421 communicated with the recess 41.

The horizontal lock bolt unit 50 includes a horizontal bolt element 51, a T-shaped second rotary lever 52, and a transverse lock pin 523. The bolt element 51 has an externally threaded inner section 511 engaging threadably the horizontal threaded hole 24 of the pivot member 20, an outer section 512 extending through the small-diameter outer section of the central hole 42 of the sleeve member 40 and formed with a transverse pin hole 513, and a middle flange section 512a interconnecting securely the inner and outer sections 511, 512 and received fittingly within the large-diameter inner section 421 of the central hole 42 of the sleeve member 40. The rotary lever 52 has a horizontal connecting rod and two radial lever sections secured to two sides of the horizontal connecting rod. The horizontal connecting rod has an inner end surface formed with a horizontal bore 521 engaging fittingly the outer section 512 of the bolt element 51, and two aligned radial pin holes 522 formed through the wall of the horizontal connecting rod and communicated with the bore 521. The lock pin 523 extends through the radial pin holes 522 of the rotary lever 52 and the pin hole 513 of the bolt element 51 so as to lock the lever 52 on the bolt element 51. The sleeve member 40 is clamped between the second rotary lever 52 and the large-diameter base section of the nose of the pivot member 20, so as to lock the sleeve member 40 on the pivot member 20.

The positioning assembly 60 consists of a fixed plate 61, a removable plate 62, four lock bolts 63 (only one is shown in FIG. 2), a rotary knob 64 and a pinion 65. The fixed plate 61 has an inner surface formed with an open-ended horizontal slot 611, a knob hole 612 formed through the plate 61, four threaded holes 613 formed in four corners of the plate 61, and a curved notch 614 formed in the lower edge of the plate 61 and engaging a peripheral surface of the sleeve member 42 in such a manner that the fixed plate 61 is welded to the sleeve member 4. The removable plate 62 has an inner surface formed with an open-ended horizontal slot 621, a knob hole 622 formed therethrough, four fastener holes 623 formed in four corners of the plate 62, and a curved notch 624 aligned with the notch 614 of the fixed plate 61. The plates 61, 62 constitute a tubular unit defining a longitudinal passage therebetween which is formed by the slots 611, 621.

The bolts 63 extend through the fastener holes 623 of the removable plate 62 to engage threadedly the threaded holes 613 of the fixed plate 61 and four lock nuts 631 (only three are shown in FIG. 2).

The knob 64 extends through the knob holes 612, 622 of the plates 61, 62 to engage threadably a lock nut 642 and has a square-cross-sectioned portion 641 engaged fittingly within a square hole 651 of the pinion 65 between the plates 61, 62 so as to rotate the pinion 65 synchronously with the knob The coupler rod 70 has a straight first end section which extends into the passage of the tubular unit of the positioning assembly 60, that is formed by the slots 611, 621 of the plates 61, 62, and which is provided with a fixed rack 71 engaging the outer peripheral teeth 652 of the pinion 65 so as to convert rotation of the knob 64 into the movement of the coupler rod 70 between the plates 61, 62. The coupler rod 70 further has a bent second end section 72 having a distal end provided with a fixed ball 73.

The machine 100 includes a machine body, several press rollers 101 mounted rotatably on the machine body so as to press a workplace, such as a wooden plate, on the worktable 120, a positioning ring 102 having a central hole 103 and an inward flange 104 projecting from an end thereof, and two aligned horizontal bar holes 105 formed through the wall of the ring 102. The fixing seat 80 is in the form of a hollow cylinder and has an accommodation space 81, an outward flange 82 located in the ring 102 of the machine 100 and abutting on the inward flange 104 of the ring 102, a cylindrical body 83 having a left end integrally formed with the outward flange 82, and a guide notch 84 formed in the wall of the cylindrical body 83. The bar 110 extends through the bar holes 105 of the ring 102, in such a manner that the retaining rings 111 are received within the annular grooves of two ends of the bar 110 outside the ring 102, so as to retain the outward flange 82 of the fixing seat 80 between the inward flange 104 and the bar 110, thereby positioning the fixing seat 80 on the ring 102.

The push member 90 is hollow and has a concaved end wall 91 and two aligned lugs 92 projecting from the left end of the push member 90 to abut against the bar 110. The knob 113 has a threaded stem 113a extends threadedly through the threaded hole 112 of the bar 110 to contact the inner surface of the concaved end wall 91 of the push member 90, so as to press the end wall 91 against the ball 73, thus fixing the coupler rod 70 on the base member 10 and the machine 100. Accordingly, the machine 100 can be positioned on the worktable 120. The knob 113 can be actuated to release the ball 73 from the push member 90.

Figure 5:
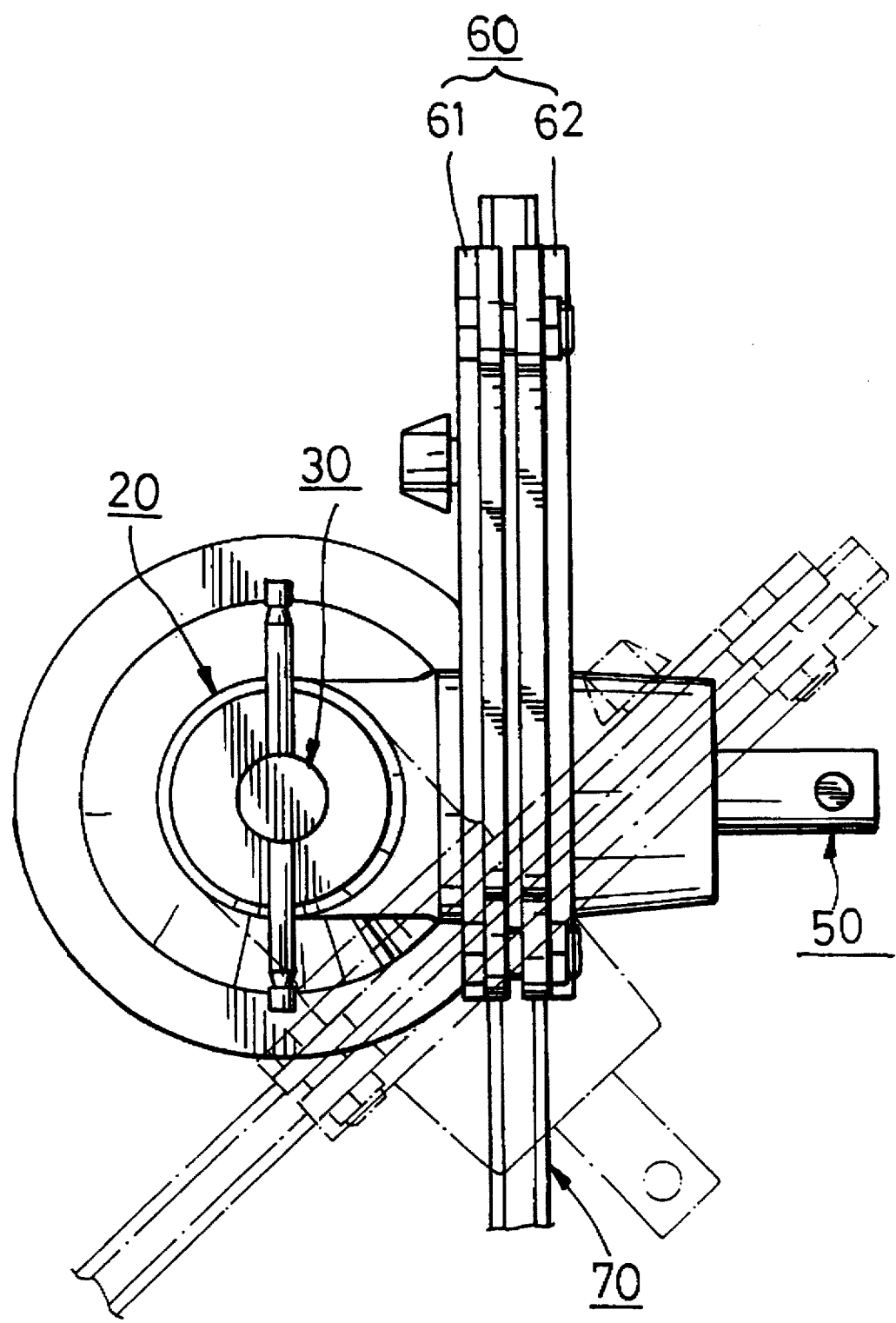
FIG. 5 illustrates how the pivot member is rotated about a vertical axis relative to the base member in accordance with this invention.

When it is desired to the horizontal movement of the machine 100 on the worktable 120, the first rotary lever 32 is rotated on the pivot member 20, so as to loosen the vertical bolt element 31 from the base member 10, and so as to enable the vertical portion 21 of the pivot member 20 to be rotated about a vertical axis on the neck 12, thereby turning the coupler rod 70 to the position shown in the phantom lines of FIG. 5.

Figure 6:
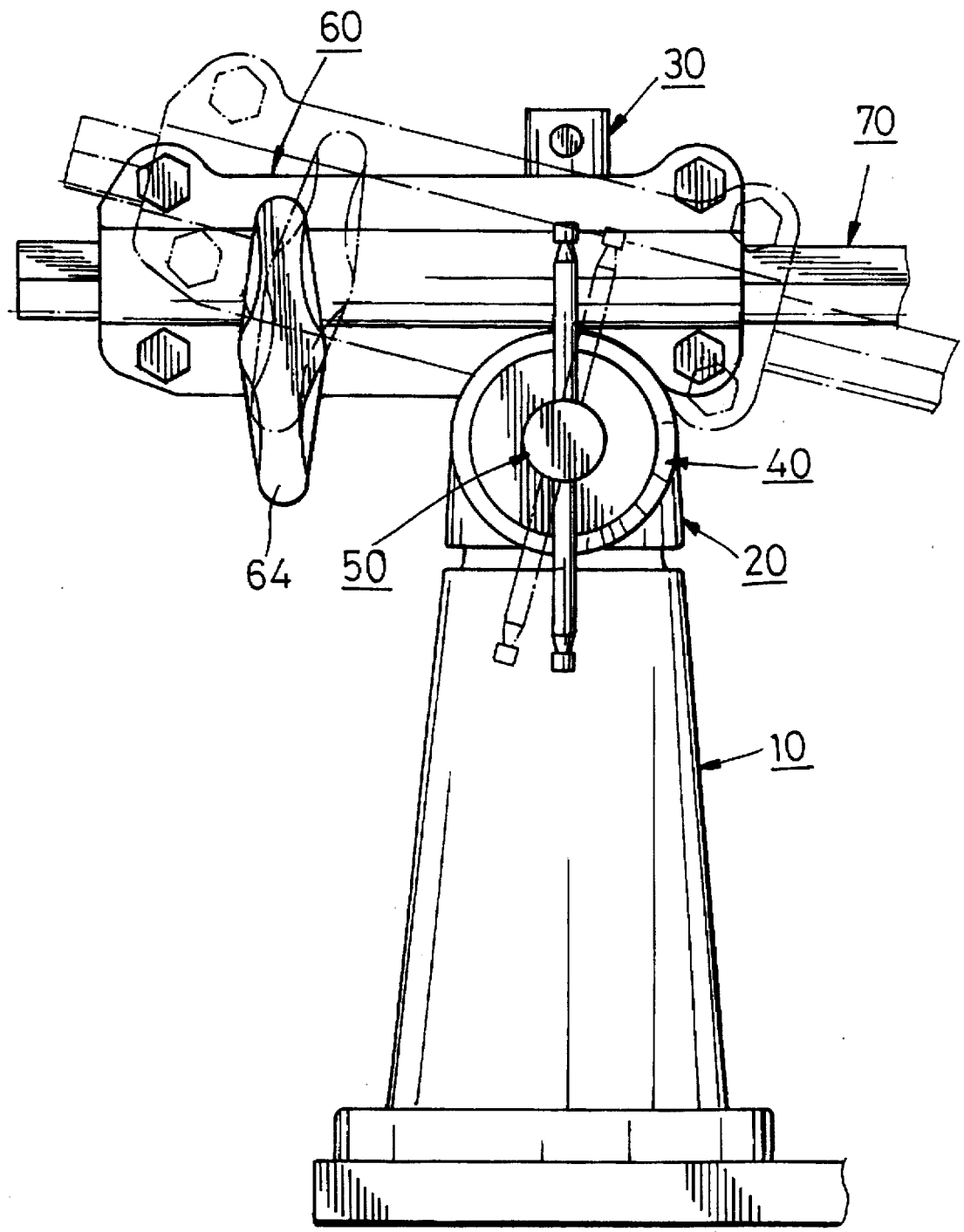
FIG. 6 illustrates how a horizontal sleeve member is rotated about a horizontal axis relative to the pivot member in accordance with this invention.

When it is desired to press the rollers 101 of the machine 100 on an inclined surface of a workpiece, the second rotary lever 52 is rotated on the sleeve member 40, so as to loosen the horizontal bolt element 51 from the pivot member 20, and so as to enable the sleeve member 40 to be rotated about a horizontal axis on the nose of the pivot member 20, thereby turning the coupler rod 70 to the position shown in the phantom lines of FIG. 6.

It can be appreciated that the end sections and the base sections of the neck of the base member 10 and the nose of the pivot member 20 are reduced gradually endwise in diameter, so that the pivot member 20 can be easily sleeved on the neck of the base member 10, and that the sleeve member 40 can be easily sleeved on the nose of the pivot member 20.

With this invention thus explained, it is apparent that numerous modifications and variations can be made without departing from the scope and spirit of this invention. It is therefore intended that this invention be limited only as indicated in the appended claims.

I claim:

1. An adjustable supporting apparatus for supporting a workpiece feeding machine on a worktable, comprising:
   - a base member adapted to be fixed on the worktable and having a generally circular-cross-sectioned upwardly projecting neck which has an top end surface formed with a vertical threaded hole;
   - a pivot member having a vertical sleeve portion and a nose which projects horizontally from said vertical sleeve portion and which has an end surface formed with a horizontal threaded hole, said vertical sleeve portion having a bottom surface formed with a generally circular-cross-sectioned vertical recess within which said neck is received in such a manner that said vertical sleeve portion can rotate about a vertical axis on said neck;
   - a horizontal sleeve member having an inner end surface formed with a generally circular-cross-sectioned horizontal recess within which said nose is received in such a manner that said horizontal sleeve member can rotate about a horizontal axis on said nose;
   - a positioning assembly having a tubular unit fixed on said horizontal sleeve member so as to define a longitudinal passage in said tubular unit, and a pinion mounted rotatably in said tubular unit;
   - a coupler rod having a straight first end portion which extends into said passage of said tubular unit and which is provided with a fixed rack engaging said pinion of said positioning assembly in such a manner that said pinion can be rotated so as to move said coupler rod within said tubular unit, and a bent second end portion with a distal end which is provided with a fixed ball adapted to be locked releasably on the machine, said ball being capable of being released from and rotated on the machine; and
   - two lock bolt units respectively locking said pivot member and said horizontal sleeve member on said base member and said pivot member.

2. An adjustable supporting apparatus as claimed in claim 1, wherein each of said sleeve portion of said pivot member and said sleeve member has a circular end wall with a central hole formed therethrough which has a small-diameter outer section and a large-diameter inner section that has a diameter larger than that of said small-diameter outer section and that has an inner end communicated with and adjacent to a corresponding one of said vertical recess and said horizontal recess, and an outer end communicated with and adjacent to said small-diameter outer section, each of said neck and said nose having a large-diameter base section and a small-diameter end section which has a diameter smaller than that of said large-diameter base section, said lock bolt units including:
   - a vertical bolt element having an externally threaded lower section engaging threadably said vertical threaded hole of said neck, an upper section extending through said small-diameter outer section of said central hole of said end wall of said vertical sleeve portion of said pivot member and having a horizontal pin hole formed through said upper section, and a middle flange section interconnecting securely said upper and lower sections and located within said large-diameter inner section of said central hole of said end wall of said vertical sleeve portion of said pivot member;
   - a T-shaped first rotary lever including a vertical connecting rod and two horizontal lever sections secured to two sides of an upper end portion of said rod, said rod of said first rotary lever having a bottom surface formed with a vertical bore, and two aligned horizontal pin holes formed through a wall of said rod of said first rotary lever in communication with said vertical bore, said upper section of said vertical bolt element extending into said vertical bore;
   - a horizontal lock pin extending through said two horizontal pin holes of said first rotary lever and said pin hole of said vertical bolt element so as to lock said first rotary lever on said vertical bolt element, thereby clamping said vertical sleeve portion of said pivot member between said first rotary lever and said large-diameter base section of said neck and preventing rotation of said vertical sleeve portion of said pivot member relative to said base member;
   - a horizontal bolt element having an externally threaded inner section engaging threadably said horizontal threaded hole of said nose, an outer section extending through said small-diameter outer section of said central hole of said end wall of said horizontal sleeve member and having a transverse pin hole formed through said outer section of said horizontal bolt element, and a middle flange section which interconnects securely said inner and outer sections of said horizontal bolt element and which is located within said large-diameter inner section of said central hole of said end wall of said horizontal sleeve member;
   - a T-shaped second rotary lever including a horizontal connecting rod and two radial lever sections secured to two sides of an outer end portion of said rod of said second rotary lever, said rod of said second rotary lever having an inner end surface formed with a horizontal bore, and two aligned radial pin holes formed through a wall of said rod of said second rotary lever in communication with said horizontal bore, said outer section of said horizontal bolt element extending into said horizontal bore;

a transverse lock pin extending through said two radial pin holes of said second rotary lever and said pin hole of said horizontal bolt element so as to lock said second rotary lever on said horizontal bolt element, thereby clamping said horizontal sleeve member between said second rotary lever and said large-diameter base section of said nose and preventing rotation of said horizontal sleeve member relative to said base member.

3. An adjustable supporting apparatus as claimed in claim 2, wherein said small-diameter end section of each of said nose and said neck is truncated conical and has a diameter which decreases endwise, said recesses of said vertical sleeve portion of said pivot member and said horizontal sleeve member being truncated conical so as to receive fittingly said small-diameter end sections of said nose and said neck therein, whereby, in assembly, said vertical sleeve portion of said pivot member and said horizontal sleeve member can be respectively and easily sleeved on said neck and said nose.

4. An adjustable supporting apparatus as claimed in claim 1, wherein said positioning assembly includes a fixed plate fastened to said horizontal sleeve member and having an inner surface formed with an open-ended horizontal slot, a removable plate screwed to said fixed plate and having an open-ended horizontal slot aligned with said slot of said fixed plate so that said slots cooperatively constitute said passage between said fixed plate and said removable plate, and a rotary knob connected securely to said pinion so as to rotate said pinion upon actuation.

* * * * *

UNITED STATES PATENT AND TRADEMARK OFFICE
CERTIFICATE OF CORRECTION

PATENT NO. : 5,718,408
DATED : February 17, 1998
INVENTOR(S) : Ching-Chi Lin

It is certified that error appears in the above-indentified patent and that said Letters Patent is hereby corrected as shown below:

Column 1, line 8, "workplace" should be --workpiece--.

Column 1, line 36, "in-lined" should be --inclined--.

Column 1, line 39, "workplace" should be --workpiece--.

Column 1, line 50, "add" should be --and--.

Column 1, line 51, "workplace" should be --workpiece--.

Column 1, line 53, after "4a" insert --is--.

Column 1, line 55, "In" should be --in--.

Column 2, line 12, "Machine" should be --machine--.

Column 2, line 47, "workplace" should be --workpiece--.

Column 2, line 47, after "on" insert --a--.

UNITED STATES PATENT AND TRADEMARK OFFICE
CERTIFICATE OF CORRECTION

PATENT NO. : 5,718,408
DATED : February 17, 1998
INVENTOR(S) : Ching-Chi Lin

It is certified that error appears in the above-indentified patent and that said Letters Patent is hereby corrected as shown below:

Column 3, line 40, "1ever" should be --lever--.

Column 4, line 37, after "knob" insert --64.--.

Column 4, line 49, "workplace" should be --workpiece--.

Column 5, line 10, "the" (first occurrence) should be --effect--.

Signed and Sealed this

Thirtieth Day of June, 1998

Attest:

BRUCE LEHMAN

Attesting Officer

Commissioner of Patents and Trademarks